United States Patent Office 3,331,250
Patented July 18, 1967

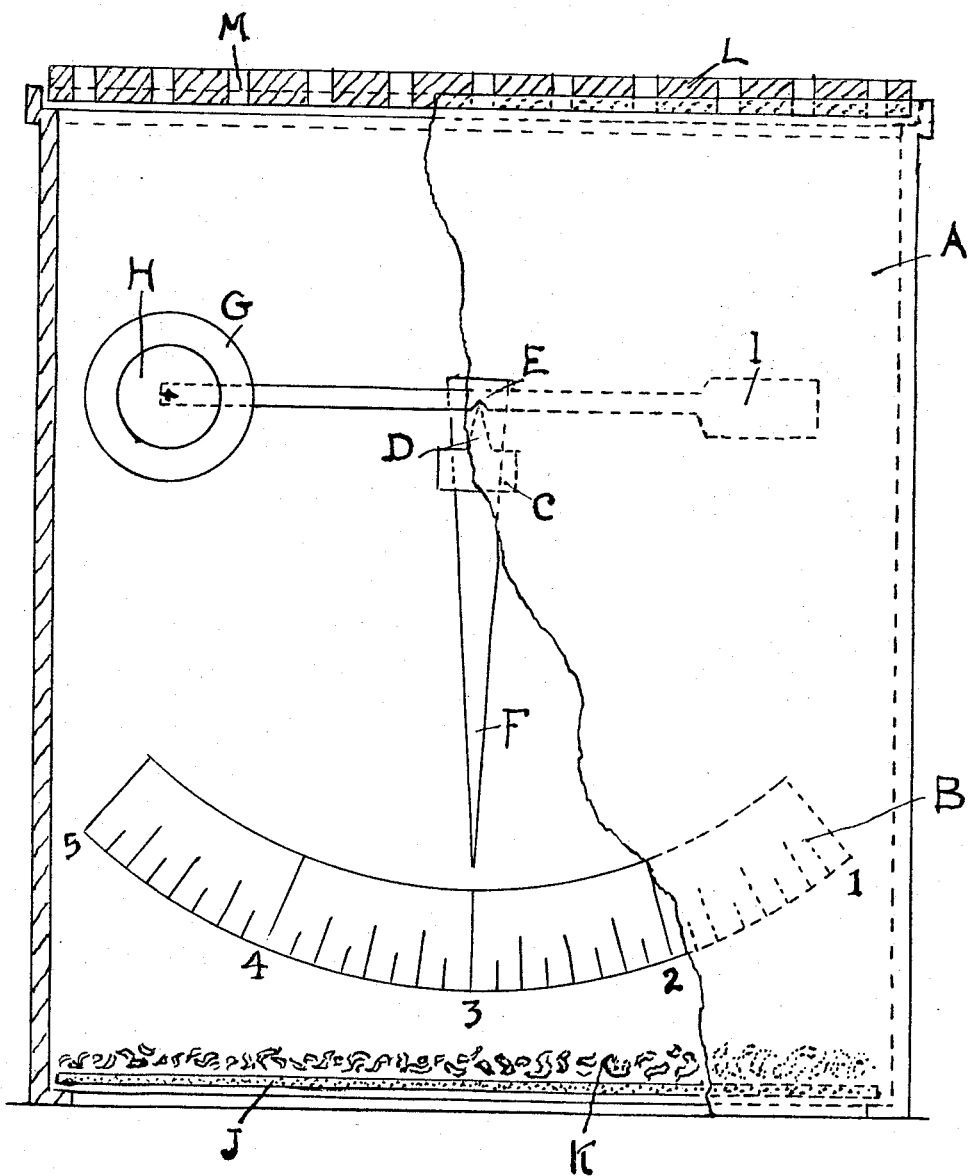

3,331,250
APPARATUS FOR INDICATING THE METEOROLOGICALLY CONDITIONED FIRE RISK
Berndt V. Orre, Cardellgatan 4, Stockholm, Sweden
Filed Mar. 6, 1964, Ser. No. 349,855
2 Claims. (Cl. 73—432)

The fire hazard is in the first line determined by the moisture quota of the usual, more or less hygroscopic fuels. The moisture content of the forest ground fuels at a certain moment is made up by the concerted, cumulative action of precipitation, temperature, infrared solar radiation and wind during a period prior to the actual moment, accentuated, respectively modified by the daily rhythm and vagaries of the relative air humidity, plus the eventual wind at the actual moment as an oxygen-supplying and convective factor. A fire as a rule starts in the finer, topmost ground fuels, which because of the relation surface-volume dry out more easily and stabilize themselves more rapidly and at a lower moisture level than the coarser grades. In spring and summer, there is a remarkable parallellism between the frequency of the fires in forests and in buildings. Inside of buildings, the action of relative air humidity and temperatures is more cumulative and epitomizes the entirety or meteorological factors.

The meteorologic factors thus being the prerequisites may be said to constitute causes, and the fire risk the effect. Mostly, said causes are measured by the usual meteorological instruments, which are not specific to the present purpose, and the effect is estimated. Such an estimate requires trained operators and nevertheless will be more or less guess-work, because: The period during which the accumulating factors have been at work to produce the actual effect is of indeterminable length, and moreover said factors may have co-operated or counteracted each other. The relative air humidity is subject to frequent and wide variations. The meteorological measurings are made at different elevations and under different conditions than at soil level, where the values of temperature and relative air humidity are often, and the wind speed always, quite different. The wind for instance is measured at an elevation above the forest canopy. At soil level, the velocity will be extremely reduced by the varying degree of denseness of the vegetation, the passage over the canopy causing some updraft, however. Conditions at soil level in forests may be extremely varying, and the fuel in forests is the reverse of homogenous. Also, the meteorologic estimates can for practical reasons only apply to comparatively large districts. In such areas, weather conditions may vary considerably locally, especially during periods of higher risk because of thunderstorms, squalls etc., and the variation as regards soil, slash, vegetation and curing may be very great.

Instead of measuring the meteorological causes and adjudging the effect, it would seem indicated to measure the effect, viz. the degree of moisture content of the actual ground fuel. As a means of measuring the fire hazard this is not feasible, however, because the moisture content of the actual fuels at any sampling spot will not be uniform but very heterogeneous, the fuels being finer and coarser, topmost or lower-down, having different degrees of hygroscopicity and curing etc. And even if a mean moisture quota at such sampling would be one hundred percent or even more, this would not preclude a fire, as the topmost, finer fuels would as often as not be flammable and, in the presence of a moderate wind, produce enough heat to allow the fire to proceed into lower strata and spread. Moreover, samplings at different, even if neighboring spots would mostly produce quite different results, due to differences as regards slash and vegetation, soil and protective canopy, sunshine and shade, wind velocity reduction according to the degree of forest denseness, topography etc. To arrive at a serviceable average of fire hazard even in a very restricted area by measuring the moisture content of the actual fuel would require such a great number of measurings as to be perfectly impracticable and be so time-consuming as to render the measurements at the start inadequate long before the last samplings. For instance, the relative air moisture percentage may quadruple or the reverse in a matter of hours, and some fuels are adaptable to such changes with a minimum of time lag.

The problem of measuring the fire hazard is complicated by the facts that (1) in every single spot the intrinsic character of the fuel, and its intrinsic susceptibility to be influenced by the meteorologic factors varies within wide limits, (2) this character of the fuel will be different in different spots, (3) the meteorologic factors are subject to local variations, and (4) the degree of possible influence and action by the temporarily existing complex of meteorologic factors varies because of vegetation, soil and topographical differences.

It is an object of the present invention to provide a device which automatically and continuously measures and indicates the effect, regardless of how and how long the causes, viz. the complex of weather factors may have been at work to produce said effect.

It is another object of the present invention to provide such a device sufficiently simple and self-contained so as not to require any trained operators, calculations or estimates, but to be serviceable for use locally by any foresters, firemen or others, so that any local variations, pertaining to weather or forestry, may be taken into account.

It is another object of the present invention to provide a device, which in an open place and consequently not influenced by the varying conditions of fuels and meteorological factors in the forests simulates and reproduces a universal average of such conditions.

It is another object of the present invention to provide a device consisting of a casing or frame transparent to the eye and transmissive in regard to the infrared solar radiation, a bottom hygroscopically equivalent to a universal average of the forest ground fuel and transmissive in regard to the soil moisture, an opaque lid with perforations, simulating a universal average of the reductive influence of the forest denseness and canopy on wind, precipitation and solar radiation, and inside the transparent casing a balance having a sentient organ adapted to be influenced in part by the soil and soil cover moisture in the casing, in part directly by the wind updraft through the perforated lid and the non-cumulative relative air moisture, a scale graduated in terms of fire hazard, and a pointer operatively connected with the balance sentient organ and adapted to move over said graduated scale.

With these and other objects in view, which will become apparent in the following detailed description, the present invention will be clearly understood in connection with the accompanying drawing of a preferred embodiment of my invention.

The figure presents a front view of the device. A represents a transparent, preferably rectangular casing, B a graduated scale affixed to the inside of the forefront of the casing A (the graduation as shown in Swedish standard, but should elsewhere be national standard) and C a pivot likewise affixed, and having an edge D. On the edge D, a balance E is suspended, fitted with a pointer F, a lamellate sentient organ, the laminae whereof G and H having degrees of hygroscopicity, and a counterweight I. The bottom of the casing A is a plate having the same degree of hygroscopicity as the average coarser ground fuels, preferably a piece of foam plastics, and is covered to about ½ inch in height with wood shavings having the same degree of hygroscopicity as the average of the finer forest ground fuels. The laminae G, preferably wooden, have a degree of hygroscopicity about midway between J and L and the laminae H, preferably of a cellulose fabric, a slightly higher degree than K. L is an opaque cover, perforated by openings M, the joint area of which represents roughly half the lid area. When the device is placed on the bare soil in an open site, the interior of the device is exposed to the action of the cumulative weather factors precipitation, solar radiation, temperature and wind to the same degree as an average of the forest fuels, and as regards the relative air humidity, there will be a reciprocal action between the comparatively high sensitiveness of the laminae H and the bottom J–K in contact with the soil moisture. The apparatus continuously indicates on the scale B, easily visible through the transparent casing, the actual degree of fire hazard.

While I have thus disclosed one embodiment of the present invention, it is to be understood that this embodiment is by example only and not in a limiting sense, the scope of the invention being by the claims. For instance, a single sentient organ may have the requisite intermediate hygroscopically between G and H.

Having thus described the invention, what I claim as new and desire to be secured by Letters Patent is:

1. A device for automatically and continuously determining and indicating the meteorologically conditioned fire risk, characterized by a casing having transparent sides, an opaque lid with calibrated perforations, and a bottom of stratified hygroscopic equivalents to averages of the ground fuels, and inside said casing a balance mechanism comprising a sentient organ having an intermediate degree of hygroscopicity, a scale graduated in terms of fire hazard degrees, and a pointer operatively connected with the sentient organ and adapted to move over the said graduated scale.

2. A device for automatically and continuously determining and indicating the meteorologically conditioned fire risk, characterized by a casing having transparent sides, an opaque lid with calibrated perforations, and a bottom of stratified hygroscopic equivalents to averages of the ground fuels, and inside said casing a balance mechanism comprising a composite sentient organ, different parts of which having different degrees of hygroscopicity, a scale graduated in terms of fire hazard degrees, and a pointer operatively connected with the sentient organ and adapted to move over the said graduated scale.

References Cited
UNITED STATES PATENTS

| | | | |
|---|---|---|---|
| 892,916 | 7/1908 | Traver | 73—337 X |
| 1,878,191 | 9/1932 | Scott | 73—335 X |
| 1,995,550 | 3/1935 | Scott | 73—336 X |
| 2,268,442 | 12/1941 | Crawford | 73—335 X |
| 2,777,324 | 1/1957 | Ives | 73—73 |

FOREIGN PATENTS

| | | |
|---|---|---|
| 215,702 | 6/1961 | Austria. |
| 432,599 | 8/1926 | Germany. |

RICHARD C. QUEISSER, *Primary Examiner.*

E. D. GILHOOLY, *Assitant Examiner.*